(12) United States Patent
Giroti et al.

(10) Patent No.: US 7,061,928 B2
(45) Date of Patent: Jun. 13, 2006

(54) UNIFIED XML VOICE AND DATA MEDIA CONVERGING SWITCH AND APPLICATION DELIVERY SYSTEM

(75) Inventors: Sudhir K. Giroti, Acton, MA (US); Mandakini Pahooja, Acton, MA (US)

(73) Assignee: Azurn Networks, Inc., Waltham, MA (US)

( * ) Notice: Subject to any disclaimer, the term of this patent is extended or adjusted under 35 U.S.C. 154(b) by 917 days.

(21) Appl. No.: 10/106,852

(22) Filed: Mar. 26, 2002

(65) Prior Publication Data

US 2003/0018700 A1 Jan. 23, 2003

Related U.S. Application Data

(60) Provisional application No. 60/278,808, filed on Mar. 26, 2001.

(51) Int. Cl.
*H04L 12/28* (2006.01)
*H04L 12/56* (2006.01)

(52) U.S. Cl. .................. 370/422; 370/493; 370/352

(58) Field of Classification Search ........ 370/351–356, 370/422, 426, 493, 494, 495, 389; 709/217, 709/218, 219, 227, 311; 455/414; 379/88.17, 379/90.01
See application file for complete search history.

(56) References Cited

U.S. PATENT DOCUMENTS

| | | | |
|---|---|---|---|
| 5,787,437 A * | 7/1998 | Potterveld et al. | 707/103 R |
| 5,857,197 A * | 1/1999 | Mullins | 707/103 R |
| 5,878,120 A * | 3/1999 | O'Mahony | 379/93.09 |
| 6,336,137 B1 | 1/2002 | Lee et al. | 709/219 |
| 6,915,521 B1 * | 7/2005 | Monteiro | 719/316 |
| 2004/0053639 A1 * | 3/2004 | Petite et al. | 455/556.1 |

* cited by examiner

*Primary Examiner*—Ajit Patel
(74) *Attorney, Agent, or Firm*—Mark Levy & Associates, PLLC (57) ABSTRACT

A Unified XML integrated voice and data application delivery system includes a switch coupled to a first network and at least a second network, wherein the first network includes distinct voice and data applications and the second network includes one or more user devices, such as a cell phone, personal digital assistant (PDA), etc. The switch transfers voice and data between the applications and the user devices. A controller coupled to the switch includes a finite state machine controlling the interaction between the voice and data applications and the user devices. The finite state machine controls the transfer of voice and data between the applications and the user devices by the switch to enable a user to interact with the integrated instance of the voice and data applications simultaneously via the user devices. The second network includes data networks such as the Internet, wireless networks, and the public switched telephone network, and the user devices can include telephones, cell phones, personal digital assistants (PDAs) and other devices. A Unified XML engine governs the management and delivery of disparate XML files and RTP streams of converged voice and data content to heterogeneous devices over disparate carrier networks and protocols.

34 Claims, 5 Drawing Sheets

UNIFIED XML VOICE AND DATA MEDIA CONVERGING SWITCH AND APPLICATION DELIVERY SYSTEM

CROSS REFERENCE TO RELATED APPLICATIONS

This application claims priority under 35 U.S.C. §119(e) of U.S. Provisional Patent Application No. 60/278,808 filed Mar. 26, 2001.

STATEMENT REGARDING FEDERALLY SPONSORED RESEARCH OR DEVELOPMENT

Not Applicable

BACKGROUND OF THE INVENTION

The present invention is related to the field of network delivery of computer application services to users.

There is widespread use of computer-based services that are delivered to users via some type of network. Well known examples include the serving of hypertext and other information files by servers in the Internet, and interactive voice response (IVR) systems via which telephone users can access various types of databases or services. The Internet model of information access is becoming available via wireless devices such as personal digital assistants (PDAs), and wireless telephones are increasingly being used as a supplement to or instead of traditional wire-line phones.

The services available via different communications networks are largely independent of each other. For example, IVR applications—accessible via wire-line or wireless phones via voice interface—are generally integrated in some fashion with a switched telephone network, either public or private, whereas data applications—accessible via computers and handheld devices via data interface—are deployed in connection with some type of data network, such as the Internet or a corporate data network. A user interacting with one of these applications receives a relatively limited experience, in that the user interacts via either voice or data but not both simultaneously. For example, in an IVR application, a user is given selection choices in the form of a list of voice statements; there is no displaying of selection information such as is common in computer user interfaces. Similarly, in data applications there is generally no provision for voice interaction between the system and users. These limitations stem at least in part from the nature of the communications networks on which the services are deployed and the devices from which these services are accessed. The telephone network has been designed primarily to carry voice traffic, and provides only a very basic transmission function when carrying data. The data networks such as the Internet have been designed primarily for file transfer and other computer data exchange; only recently have these networks begun to carry voice and other real-time media. Furthermore, access devices have typically been capable of delivering either voice only or data only. Even with newer access devices that are capable of delivering both voice and data, content delivery is limited to either voice or data but not both simultaneously, due to the absence of converged or rich-media application delivery systems.

BRIEF SUMMARY OF THE INVENTION

In accordance with the present invention, a Unified XML based integrated voice and data media converging switch and application delivery system, together forming an integrated application delivery system, are disclosed that enable users to interact with computer applications in a generally richer manner, enhancing service effectiveness and user satisfaction.

The disclosed integrated application delivery system includes a switch coupled to a first network and to one or more second networks, wherein the first network includes distinct voice and data applications and the second network includes one or more user devices, such as a cell phone, personal digital assistant (PDA), etc. The switch transfers voice and data between the applications on the first network and respective ones of the user devices on the second network. A controller coupled to the switch includes a finite state machine controlling the interaction of the voice and data applications with the user. In particular, the finite state machine controls the transfer of voice and data between the applications and the user devices by the switch so as to enable a user to interact with the voice and data applications simultaneously via the user devices. Thus, a user can interact with an IVR system via a cell phone, for example, while simultaneously viewing related data from a database in a graphical form on a PDA. The user is given greater flexibility in managing the nature of the interaction with the applications, resulting in greater overall effectiveness and user satisfaction.

The Unified XML component of the voice and data media converging switch and application delivery system allows various heterogeneous XML DTD formats (vocabularies) to be integrated as-is on a single software platform, thereby allowing convergence, unification and delivery of different presentation formats without any modification to their respective vocabularies or DTD. The integrated application delivery system delivers both voice and data to end devices simultaneously and synchronously. The Unified XML capability allows Voice XML to be delivered to a mobile phone user while also delivering WML, clipping or FlexScript to the same user's handheld device such as a Palm V, Palm VII or a BlackBerry to enable users to interact via both voice and data devices interactively in a synchronous and simultaneous way.

Other aspects, features, and advantages of the present invention will be apparent from the detailed description that follows.

BRIEF DESCRIPTION OF THE SEVERAL VIEWS OF THE DRAWING

The invention will be more fully understood by reference to the following Detailed Description of the Invention in conjunction with the Drawing, of which.

DETAILED DESCRIPTION OF THE INVENTION

The disclosure of U.S. Provisional Patent Application No. 60/278,808 filed Mar. 26, 2001 is hereby incorporated by reference herein.

Figure 1:
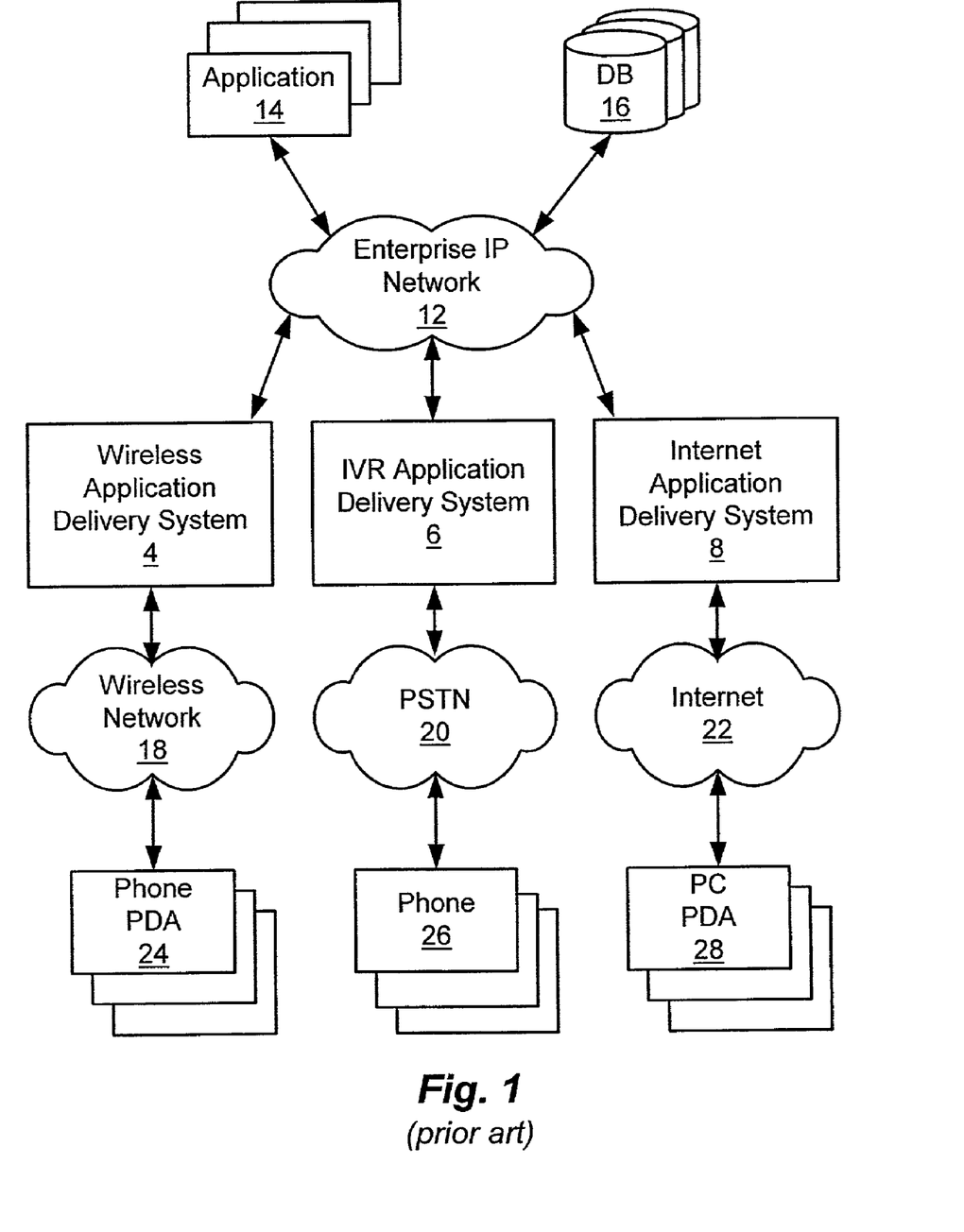
FIG. 1 is a block diagram of conventional application delivery systems enabling delivery of either a voice or data application over a single network.

In a conventional arrangement illustrated in FIG. 1, separate application delivery systems including a wireless application delivery system 4, an interactive voice response (IVR) application delivery system 6, and an Internet application delivery system 8 are coupled to an enterprise Internet Protocol (IP) network 12, which is also coupled to one or more servers on which application programs or "applications" 14 and one or more databases 16 reside. The applications 14 and databases 16 may include applications and/or databases that are private to an enterprise, such as corporate scheduling or records, or may include applications and/or databases used in providing services to others, such as an automated ticket purchasing system for use by the public. Additionally, the applications 14 generally include data and "media" components, such as voice or video, in their respective user interfaces.

The various application delivery systems 4, 6 and 8 are coupled to user networks of different types, such as a wireless network 18, the public switched telephone network (PSTN) 20, and the Internet 22. These networks are connected to corresponding user devices. For example, the wireless network 18 is connected to telephones and portable computers referred to as "personal digital assistants" or PDAs 24. The PSTN 20 is connected to telephones 26, and the Internet 22 is connected to portable personal computers (PCs) and PDAs 28.

In the conventional arrangement of FIG. 1, the separate conventional application delivery systems 4, 6 and 8 are limited in their individual capacities to delivering enterprise applications 14 or databases 16 through only a single mode, i.e. voice or data, through a respective single network, i.e. wireless network 18, PSTN 20, or Internet 22, and through a single device, i.e. PSTN telephone or PDA 24, wireless phone 26, or hand-held device or PC 28.

Figure 2:
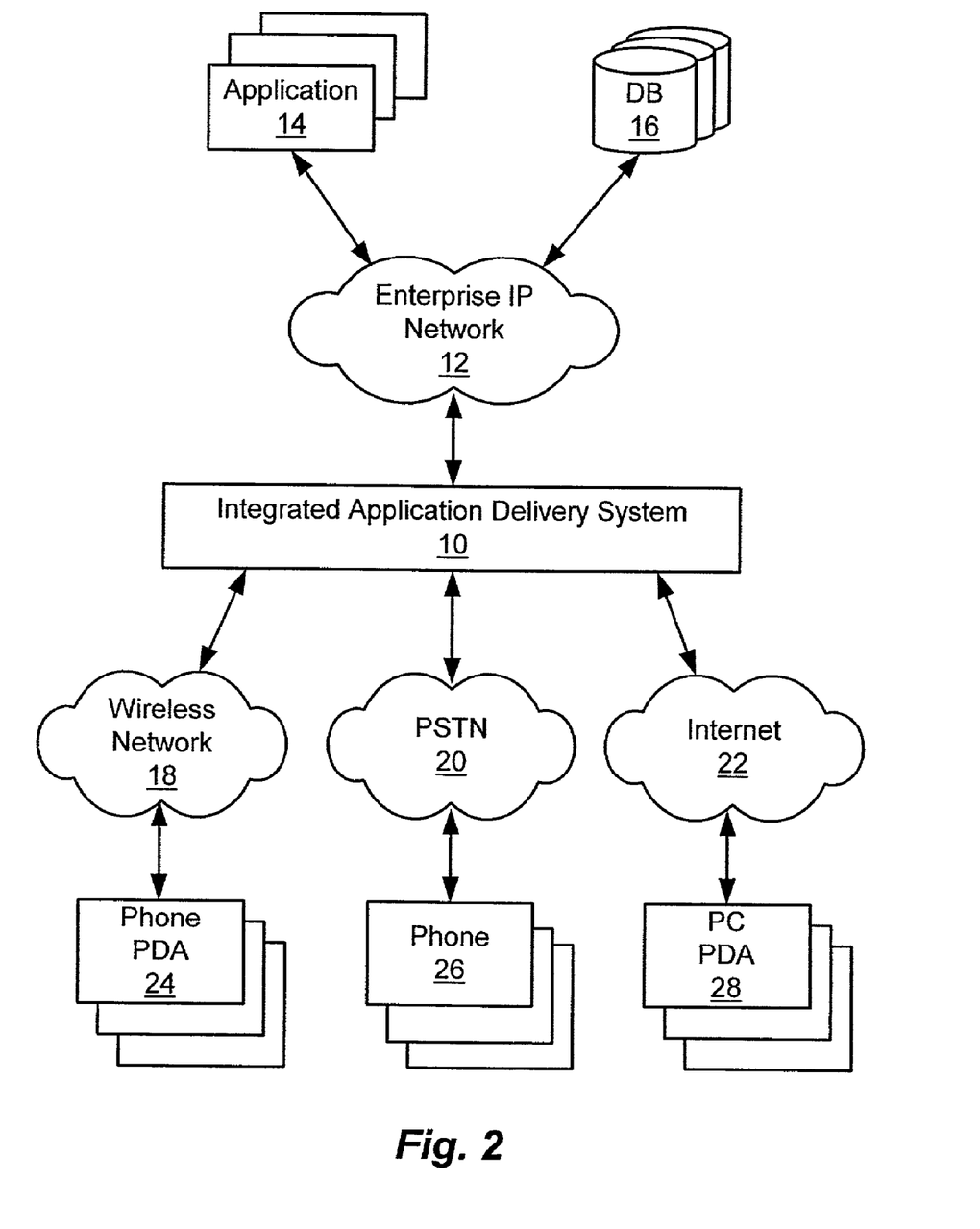
FIG. 2 is a block diagram of a wide-area network incorporating an integrated application delivery system deployable over multiple networks and heterogeneous devices in accordance with the present invention.

In FIG. 2, an integrated application delivery system (IADS) 10 in accordance with the present invention is coupled between the enterprise IP network 12 and the various networks 18, 20 and 22. The integrated application delivery system 10 allows content and information from the applications 14 and databases 16 to be delivered to any of the devices 24, 26 or 28 via the respective network(s) 18, 20 or 22. The content can be delivered in "thin-client" Extensible Markup Language (XML) formats such as Wireless Markup Language (WML), Hypertext Markup Language (HTML), voice XML, and others, and can be delivered in suitable formats for "intelligent clients" such as Palm™ handhelds, devices based on the EPOC operating system, and Pocket PCs. The device type is detected initially during operation, and then content is formatted in a manner best suited to the accessing device.

For example, if the accessing device is a mobile phone capable of communicating according to the Wireless Application Protocol (WAP), the content is delivered in WML format. Similarly, Handheld Markup Language (HDML) or compact HTML (cHTML) formats are used when the device has the appropriate capability. If the device is a traditional phone, then the information can be rendered in Voice XML. When a user uses more than one device to access data, then the content is rendered in multiple formats on multiple devices delivered over multiple networks—all simultaneously. For example, if a user uses a WAP enabled PDA device and a mobile phone in concert, then the content is delivered in a Unified XML converged format such as WML for the PDA device and Voice XML or VxML for the mobile phone device. The WAP/WML is delivered over the wireless network as a data packet while the Voice XML or VxML is delivered over either the wireless network or a dedicated voice channel of the PSTN. In the former case, both voice and data are delivered over wireless networks to devices connected to wireless networks, whereas in the latter case, voice and data are delivered over two separate networks—the PSTN and wireless networks.

Figure 3:
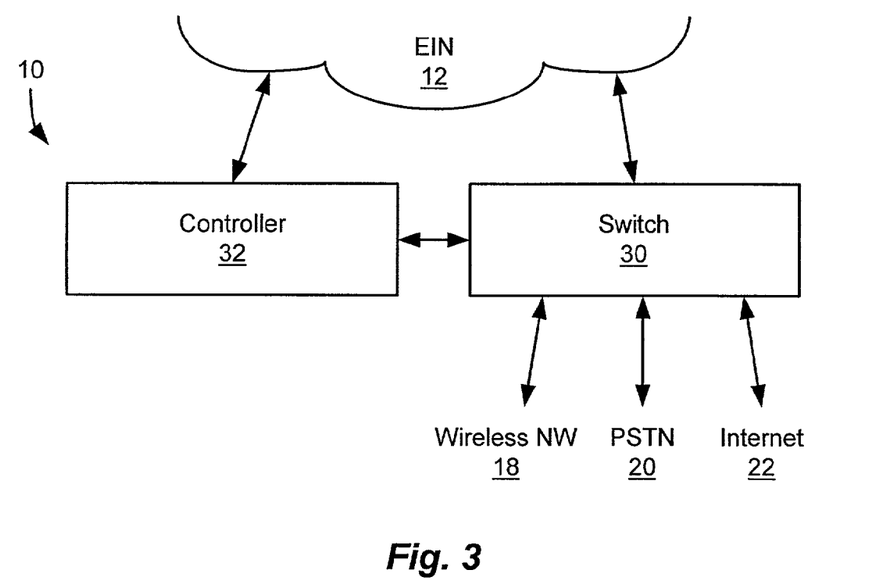
FIG. 3 is a block diagram of the integrated application delivery system of FIG. 2.

FIG. 3 shows the structure of the integrated application delivery system 10 in greater detail. It includes one or more media converging switches 30 and an Unified XML runtime controller 32. As shown, the converging switch 30 includes connections to the various user networks 18, 20 and 22, as well as to the enterprise IP network (EIN) 12. The Unified XML controller 32 is also coupled to the enterprise IP network 12 for communicating with the convergence switch 30 as well as with the applications 14 and databases 16 of FIG. 2. The Unified XML controller 32 controls the delivery of content via the convergence switch 30 using a control protocol such as MEGACO (Media Gateway Control protocol). The switch 30 performs the gateway-like function of translating data packets or streams between the enterprise IP network 12 and the user networks 18, 20, and 22. An example is presented below to illustrate this aspect of operation of the switch 30.

The Unified XML runtime controller 32 is a software platform, more particularly an Enterprise Java Beans (EJB) based distributed computing and communications environment that enables development, deployment and management of wireless and wireline applications and services that are protocol agnostic and device independent—regardless of hardware, operating system, protocol or location. The Unified XML software platform is an N-Tier distributed computing architecture that employs EJB component architecture, Java (J2EE) and Extensible Markup Language (XML) technologies. The EJB architecture provides support for transactional services and makes the technology distributed, portable, multi-tier, scaleable, and secure, and enables the deployment of the same code-base across multiple platforms. The Java development language is independent of the specific hardware or operating system. It's run-time compiled version creates byte-code that can be run on any platform supporting a Java Virtual machine. Such capability enables a single compiled version of released software that can be installed on different platforms, including Unix and NT/2000 platforms.

Remote wireless devices are supported by a "thin-client" architecture that dynamically generates XML based presentation interface to allow access from a great majority of the currently available wireless devices like WAP enabled mobile phones, Personal Digital Assistants (PDAs), Black-Berry, Handspring, HDML enabled phones etc. The architecture provides the necessary interoperability between the many heterogeneous environments, data stores, applications and presentation devices. It is a robust and scaleable platform designed for Enterprises and ASPs to integrate with Telco-class systems to provide a similar Quality of Service (QoS) provisioned over a telecommunication infrastructure and network today. The converging switch 30 is an Intelligent IP, PSTN, Wireless Switching Router that is packaged as a hardware device that can be connected on the edge of an IP network within an enterprise to provide intelligent switching and routing of messages and XML data packets between IP, Wireless and the PSTN network. The device has standard ports for connecting it to the TCP/IP network and Public Switch Telephony Network. It supports analog POTS, ISDN BRI/PRI, and T1/E1 CAS local loops. Convergent applications developed and deployed over Unified XML engine can use these interfaces to originate, terminate, and forward PSTN and Wireless voice calls. It also supports the digital handsets supported by several PBXs, including Nortel Meridian, Lucent/Avaya DEFINITY, Siemens, NEC and Mitel. By doing so, the switch can interface with PBX functionality including harnessing the voice mail and integrating with data from IP network. It supports several IP-based media and signaling protocols via standards-based LAN technologies such as Bluetooth, IEEE 802.3 (Ethernet), IEEE 802.11a, IEEE 802.11b (WiFi), ANSI41, CCS/SS7 and Hybrid Fiber Channel. It supports VOIP based upon either H.323 or SIP. In an H.323 environment, the platform can act as a gateway, endpoint, or multipoint controller unit (MCU) for voice/data and video convergence. In a SIP environment, the platform can act as a Client User Agent (CUA), Server User Agent (SUA), or proxy server. In both cases, the platform relies upon RTP in either multicast or multi-unicast modes to transfer media streams.

A key aspect of the integrated application delivery system 10 is its ability to deliver both voice and data to end devices simultaneously and synchronously. For example, Voice XML can be delivered to a user's mobile phone 24 (FIG. 2) while data content such as WML, Web Clipping Application (WCA) or FlexScript can be delivered to the same user's PDA 28. The user has the ability to interact via both voice and data devices simultaneously in a synchronized fashion. An example presented below illustrates this manner of interaction and the types of integrated applications that are made possible. Additionally, because the integrating functionality resides within the integrated application delivery system 10, this integrated voice/data interaction can be achieved without the need to re-write existing applications 14 or databases 16, which individually may be limited to only data or voice interaction, as in traditional corporate databases or interactive voice response (IVR) systems.

Figure 4:
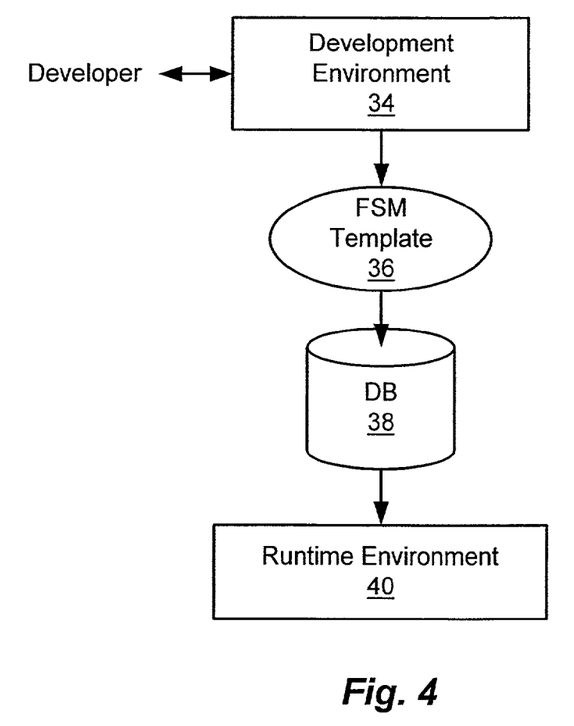
FIG. 4 is a block diagram showing the relationship between a development environment and a run-time environment for the integrated application delivery system of FIGS. 2 and 3.

FIG. 4 illustrates how an integrated voice/data application instance to be made available via the integrated application delivery system 10 is created. An application developer interacts with a development environment 34 to produce a finite state machine (FSM) template 36, which is stored in a database 38. The stored FSM template 36 is made available to a run-time environment 40 forming part of the controller 32 of FIG. 3. As described below, the FSM template 36 serves to define a sequence of operational states of an integrated application. In particular, it identifies data and media (voice or video) files or streams associated with each state, connections or paths to the user devices involved in the session, and other pertinent information.

Figure 5:
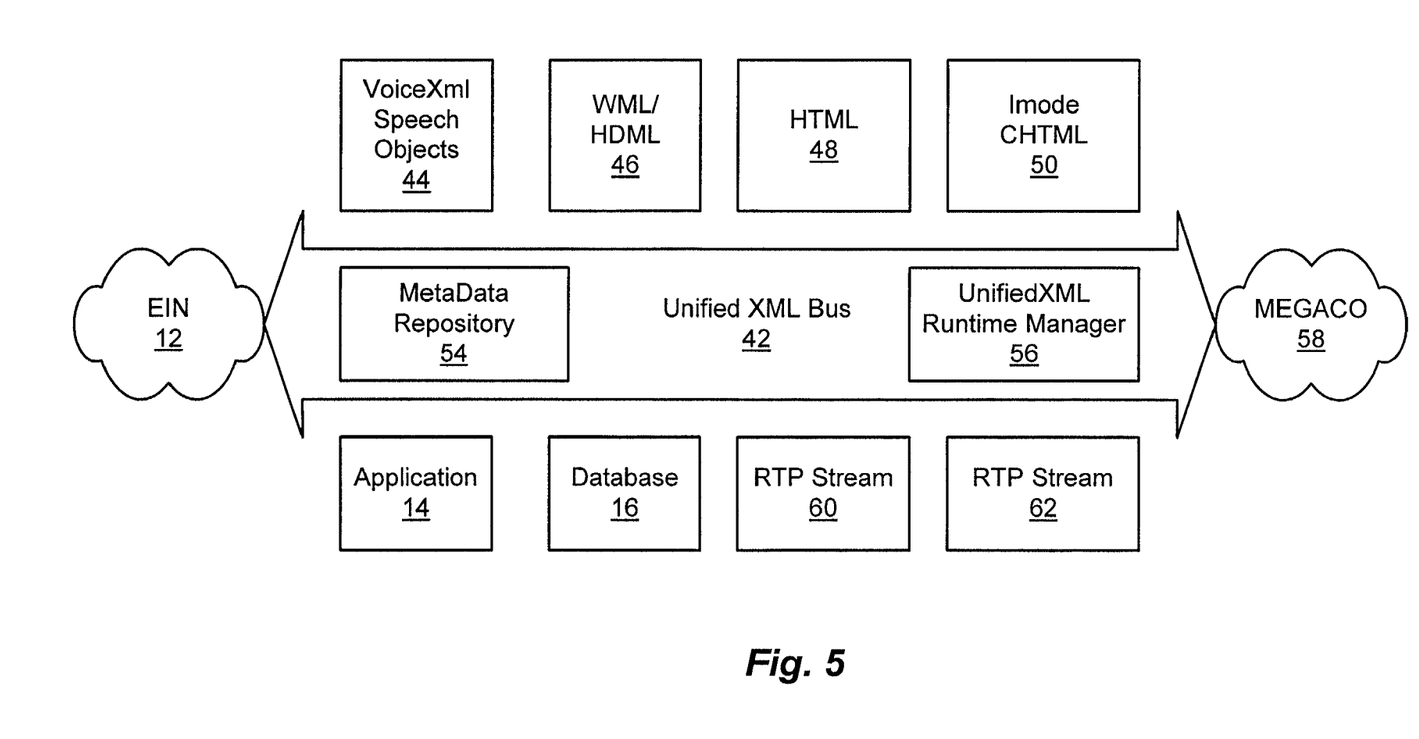
FIG. 5 is a diagram of a Unified XML engine that is part of a controller in the runtime environment of FIG. 4.

FIG. 5 illustrates a simplified example of a Unified XML Bus 42 that is an integral component of the Controller 32. The Unified XML bus 42 allows various heterogeneous XML DTD formats (vocabularies) to be integrated as-is on a single software platform, thereby allowing convergence, unification and delivery of different presentation formats without any modification to their vocabularies or DTD. These XML vocabularies include commonly available formats like Voice XML or Speech Objects 44, WML/HDML 46, HTML 48, and iMode/cHTML 50, and are capable of being em rendered on both wireline and wireless devices through the convergence switch 30 (FIG. 3). A specific format of XML (such as WML 46) can be seamlessly delivered with another format of XML (such as Voice XML 44) without any modifications to its headers, tags or structure. Within the context of the Unified XML bus 42, disparate XML formats can be delivered with a programmable application context allowing for example both WML to be delivered on a PDA and Voice XML to be delivered over a traditional PSTN or mobile phone. The architecture is also capable of supporting future versions of XML vocabularies or DTDs, thereby making the Unified XML platform upward compatible to any evolving presentation standard. Unified XML metadata repository 54 maintains the context of the application transaction and delivers disparate XML formats on disparate devices via a runtime manager 56. The Unified XML Controller 32 is connected to the EIN 12 and interoperates with the convergence switch 30 via the MEGACO protocol 58.

While the above description focuses primarily on the storage and transfer of application data as discrete files such as XML files, in alternative embodiments the data may be structured in a stream-oriented fashion such as a Real Time Protocol (RTP) stream. As indicated by exemplary RTP streams 60 and 62 in FIG. 5, such stream-oriented data can also be integrated on the Unified XML bus 50.

Figure 6:
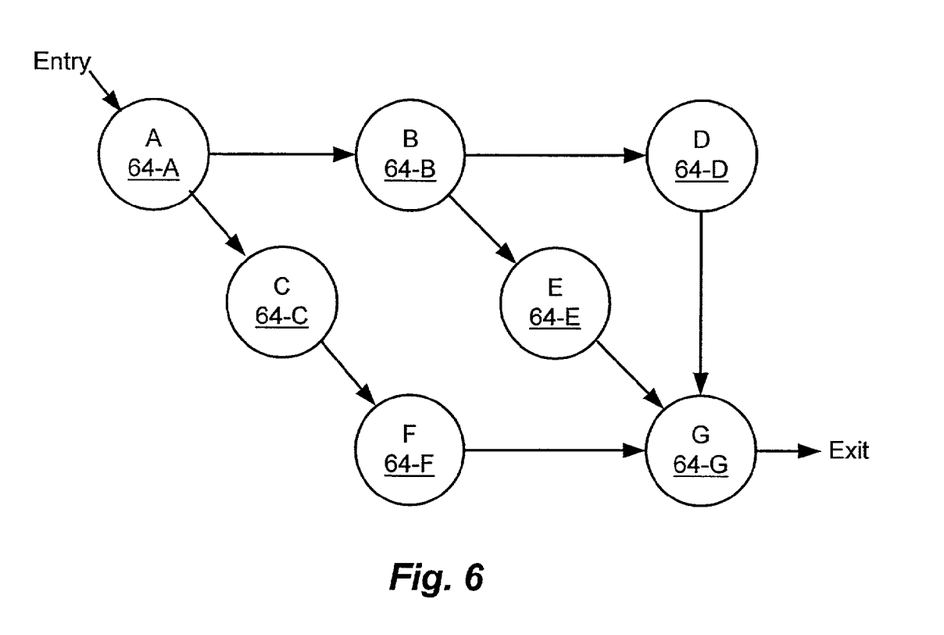
FIG. 6 is a diagram of a finite state machine (FSM) template created in the development environment and utilized in the run-time environment of FIG. 4.

FIG. 6 shows a simplified example of an FSM template 36. Each user connection is associated with an instantiation of the FSM and each user session is allocated a unique context specific to the user's session and is governed by the state of the FSM. Each state within the FSM is associated with a set of properties whose value changes upon state transition. Properties are User Authentication and authorization details, Session variables, application context, conditions for transition to next state and user's channel and device parameters. These properties are not stored within the FSM but are kept persistent by the unique instantiation of the FSM. Upon invocation of the integrated application, an initial state such as state 64-A is entered, and one or more initial data and/or voice files are played to the user as dictated by the application. Depending on user input, the FSM enters one of two subsequent states 64-B or 64-C. This pattern continues through states 64-D, 64-E, and 64-F to an exit state 64-G.

In addition to the FSM templates 36, the integrated application delivery system 10 maintains a "unifier stack" data structure that identifies different versions of XML files that can be delivered synchronously and asynchronously on disparate devices. The stack maintains pointers to these files; the files themselves are generally stored elsewhere in the enterprise network 12. The XML files may be developed using an integrated development system such as that of FIG. 4, or may be provided by third parties. In the following example, the application developers intend to deliver a Voice XML file to a mobile phone, a WML file to a WAP-enabled PDA, and a Short Message Service (SMS) message to the mobile phone.

The exemplary stack has the following structure:

| 1 | Voice XML file 1 | Device A | |
|---|---|---|---|
| 2 | WML file 1 | Device B | Asynch |
| 3 | Voice XML file 2 | Device A | Asynch |
| 4 | WML file 2 | Device B | Asynch |
| 5 | SMS file 1 | Device A | Asynch |

The first pointer identifies a Voice XML file to be delivered to "Device A", which in this case is a mobile phone. The user hears the Voice XML call and interacts with it via voice commands as defined within the context of the Voice XML programming logic.

The second pointer identifies a WML file to be delivered to "Device B", in this case a PDA. This file is to be delivered "asynchronously", i.e., upon occurrence of a trigger event. In this case, the trigger event could be the completion of the previous file (i.e., Voice XML file 1) or an explicit instruction contained in Voice XML file 1 to send WML file 1.

The third pointer identifies a second Voice XML file for delivery to the mobile phone (Device A). Further user interaction with this Voice XML file may ensue.

The fourth pointer identifies a second WML file to be delivered to the PDA.

The fifth pointer identifies an SMS message to be delivered to the mobile phone upon successful delivery and termination of the program on the PDA.

Figure 7:
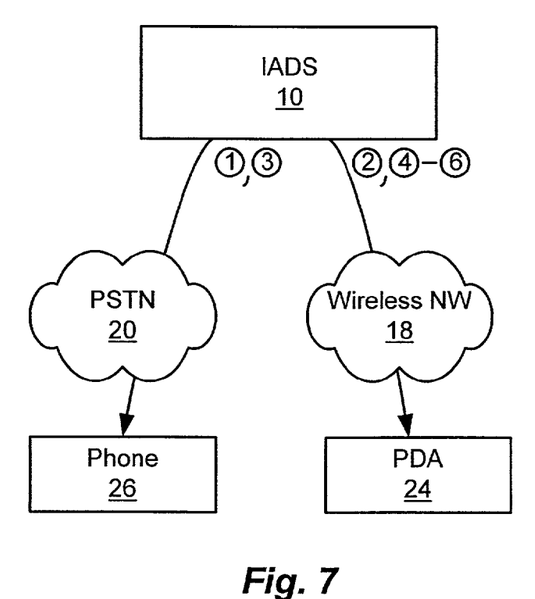
FIG. 7 is a diagram illustrating an operating example of the integrated application delivery system of FIGS. 2 and 3.

A specific operating example is now presented in connection with FIG. 7. In this example, a user employs a telephone and PDA to interact with an application for vending tickets, such as tickets to sporting events. The integrated application has an associated FSM template 36 and unifier stack residing in the integrated application delivery system 10 that define, along with the ticketing application itself, the nature of the user's interaction. In this example, there are six steps in the interaction, each involving the delivery of content over respective paths in the PSTN 20 and the wireless network 18 as indicated by the circled numbers in FIG. 7. In each case, the switch 30 of FIG. 3 operates under the control of the controller 32 to direct the appropriate file from an entity on the enterprise network 12 to the correct user network and device:

1. The IADS 10 in a ticketing enterprise delivers the IVR ticketing application via Voice XML over the PSTN 20 to the user's phone 26, enabling the user to use voice-based commands to seek availability of the tickets.
2. The IADS 10 also delivers data representing a seating layout over the wireless network 18 to the user's PDA 24. The user can examine this graphical information to help decide which seats to choose. Once a choice is made, the user can indicate the choice via the phone 26 and the IVR system.
3. The ticketing enterprise delivers Voice XML over the PSTN network 20 to seek verbal acknowledgment of the selection and authorization from the user.
4. At the same time, a WML message may be sent to the user's PDA 24 over the wireless network 18 containing a screen via which the user can submit his/her credit card number or other payment information.
5. Upon fulfilling the order, the ticketing enterprise can send an acknowledgement of the order in the form of a data message to the user's PDA 24 via the wireless network 18.
6. Optionally, a voice call can also be placed over the wireless network 18 to deliver a Voice XML acknowledgment message to the user's cell phone as well.

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What is claimed is:

1. An integrated application delivery system, comprising:
    a switch operative to be coupled to a first network and at least a second network, the first network including distinct voice and data applications, the second network including one or more user devices, the switch being operative to transfer voice and data between respective ones of the applications on the first network and respective ones of the user devices on the second network; and
    a controller coupled to the switch, the controller including a finite state machine controlling the interaction between the voice and data applications and the user devices, the finite state machine being operative to control the transfer of voice and data between the applications and the user devices by the switch so as to enable a user to interact with the voice and data applications simultaneously via the user devices.

2. An integrated application delivery system according to claim 1, wherein the controller further includes a unifier stack of pointers to files containing the voice and data to be transferred from the applications to the user devices.

3. An integrated application delivery system according to claim 2, wherein the files include markup language files.

4. An integrated application delivery system according to claim 3, wherein the markup language files include extensible markup language (XML) files.

5. An integrated application delivery system according to claim 1, wherein the user network comprises a wireless network.

6. An integrated application delivery system according to claim 5, wherein the wireless network includes a wireless application protocol (WAP) server, and wherein the data transferred over the wireless network includes a wireless markup language (WML) formatted file transferred via the WAP server.

7. An integrated application delivery system according to claim 5, wherein a single device receives both data and voice via the wireless network.

8. An integrated application delivery system according to claim 5, wherein two distinct devices receive data and voice respectively via the wireless network.

9. An integrated application delivery system according to claim 8, wherein the two distinct devices include a personal digital assistant (PDA) and a wireless telephone.

10. An integrated application delivery system according to claim 1, wherein the controller comprises a unified extensible markup language (XML) engine, the voice and data applications are disparate applications, and the unified XML engine is operative to deliver the voice and data applications simultaneously within an application context.

11. An integrated application delivery system according to claim 1, being operative with disparate carrier networks and protocols.

12. A system providing for integrated application delivery, comprising:
    a first network including distinct voice and data applications;
    at least a second network including one or more user devices;
    a switch coupled to the first network and to the second network, the switch being operative to transfer voice and data between respective ones of the applications on the first network and respective ones of the user devices on the second network; and
    a controller coupled to the switch, the controller including a finite state machine controlling the interaction of the voice and data applications with the user devices, the finite state machine being operative to control the transfer of voice and data between the applications and the user devices by the switch so as to enable a user to interact with the voice and data applications simultaneously via the user devices.

13. A system according to claim 12, wherein the controller further includes a unifier stack of pointers to files containing the voice and data to be transferred from the applications to the user devices.

14. A system according to claim 13, wherein the files include markup language files.

15. A system according to claim 14, wherein the markup language files include extensible markup language (XML) files.

16. A system according to claim 12, wherein the second network comprises a wireless network.

17. A system according to claim 16, wherein the wireless network includes a wireless application protocol (WAP) server, and wherein the data transferred over the wireless network includes a wireless markup language (WML) formatted file transferred via the WAP server.

18. A system according to claim 16, wherein a single device receives both data and voice via the wireless network.

19. A system according to claim 16, wherein two distinct devices receive data and voice respectively via the wireless network.

20. A system according to claim 19, wherein the two distinct devices include a personal digital assistant (PDA) and a wireless telephone.

21. A system according to claim 12, wherein the controller comprises a unified extensible markup language (XML) engine, the voice and data applications are disparate applications, and the unified XML engine is operative to deliver the voice and data applications simultaneously within an application context.

22. A system according to claim 12, being operative with disparate carrier networks and protocols.

23. An integrated application delivery method, comprising:
   operating a finite state machine controlling the interaction between voice and data applications and a user, the finite state machine including a plurality of operating states and a set of predetermined criteria for transitioning among the operating states;
   during first ones of the operating states of the finite state machine, engaging the user in an interactive voice component of the voice application via a first network path between the voice application and a voice-enabled user device; and
   during second ones of the operating states of the finite state machine, engaging the user in an interactive data component of the data application via a second network path between the data application and a data-enabled user device.

24. An integrated application delivery method according to claim 23, wherein the first network path includes a path through a wireless voice network and the voice-enabled user device is a wireless telephone.

25. An integrated application delivery method according to claim 23, further comprising accessing a unifier stack of pointers to files containing the voice and data to be transferred from the applications to the user devices.

26. An integrated application delivery method according to claim 25, wherein the files include markup language files.

27. An integrated application delivery method according to claim 26, wherein the markup language files include extensible markup language (XML) files.

28. An integrated application delivery method according to claim 23, wherein the user networks include a wireless network.

29. An integrated application delivery method according to claim 28, wherein the wireless network includes a wireless application protocol (WAP) server, and wherein the data transferred over the wire less network includes a wireless markup language (WML) formatted file transferred via the WAP server.

30. An integrated application delivery method according to claim 28, wherein a single device receives both data and voice via the wireless network.

31. An integrated application delivery method according to claim 28, wherein two distinct devices receive data and voice respectively via the wireless network.

32. An integrated application delivery method according to claim 31, wherein the two distinct devices include a personal digital assistant (PDA) and a wireless telephone.

33. An integrated application delivery method according to claim 23, wherein the voice and data applications are disparate applications, and a unified XML engine is operative to deliver the voice and data applications simultaneously within an application context.

34. A system according to claim 23, being operative with disparate carrier networks and protocols.

* * * * *